Feb. 28, 1967  A. A. LACHANCE ETAL  3,306,398

AUTOMATICALLY ACTUATED SHOPPING CART

Filed Oct. 15, 1965

Inventors
Armand A. Lachance
Joseph M. Howard

By Charles R. Fay,

Attorney

United States Patent Office 3,306,398
Patented Feb. 28, 1967

3,306,398
AUTOMATICALLY ACTUATED SHOPPING CART
Armand A. Lachance, % American Metal Products Co., Auburn, Mass., and Joseph M. Howard, Worcester, Mass.; said Howard assignor to said Lachance
Filed Oct. 15, 1965, Ser. No. 496,590
12 Claims. (Cl. 186—1)

This invention relates to an automatically actuated shopping cart of the type having a conveyor or the like in the bottom of the basket of the cart together with power operated means at the checkout station for actuating the same, and also to open the front gate of the cart, so that the contents of the shopping cart may be automatically discharged onto the checkout counter.

Other objects of the invention include the provision of power operated means which is actuated completely under control of the checkout operator or cashier, and which requires no effort on the part of the shopper. There is a power operated roll which is moved from an inoperative to an operative position relative to the conveyor in the bottom of the basket of the shopping cart when the shopping cart has been properly positioned with respect to the checkout counter, whereby it is snugly and tightly in contact with the conveyor in the basket so as to operate the same positively, with no attention whatsoever on the part of the shopper.

Reference is to be had to my copending application Serial No. 478,860, filed August 11, 1965.

Other objects and advantages of the invention will appear hereinafter.

Reference is to be had to the accompanying drawings in which.

Figure 1:
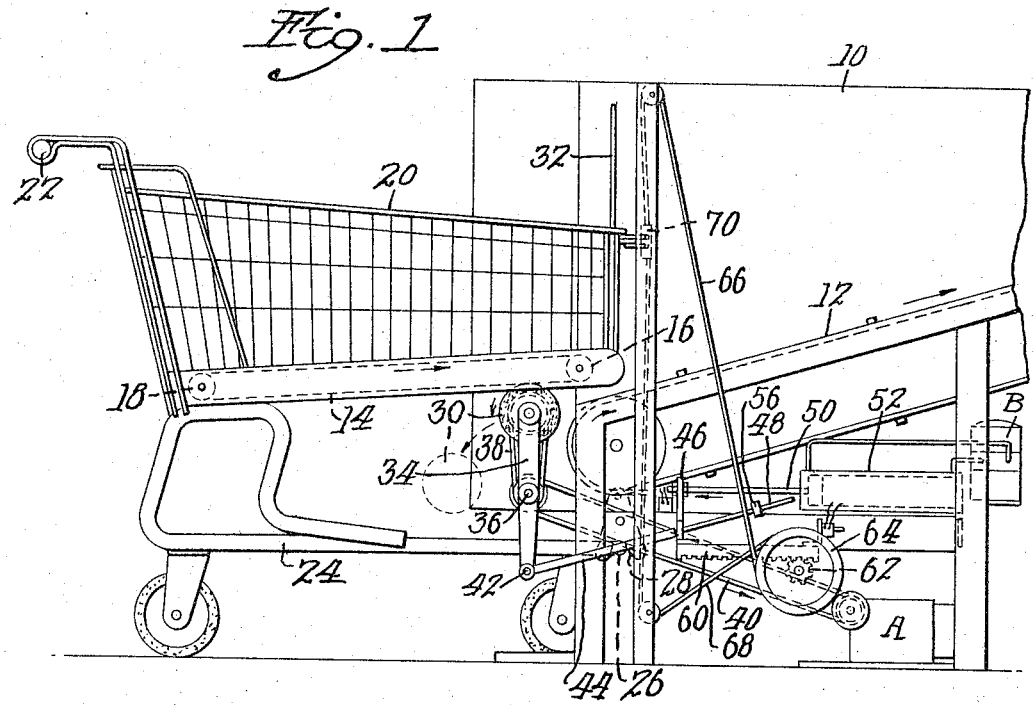
FIG. 1 is a view in side elevation illustrating the invention.

In carrying out the present invention, the reference numeral 10 indicates a checkout counter which may be of any desired construction, shape, etc. The cashier or checkout operator stands at this station. The checkout counter is provided with a power operated conveyor 12 which in this case is utilized to move in the direction of the arrow at the will of the operator to move the merchandise to an elevated position where it can be checked out. It is conceivable however that this conveyor might be horizontal if the installation of the checkout counter should be such that the cashier would stand in a depression in the floor, as might be found more convenient in certain installations.

A generally conventional nesting shopping cart having a rear swinging gate, which however has a belt conveyor in it at 14 trained over rolls 16 and 18 is shown in FIG. 1, this cart having the more or less usual nesting, tapering basket construction generally indicated at 20, pusher handle as at 22, wheeled frame 24, etc. As in most such carts, it has a forward cross bar or strut 26 on frame 24, there being an automatically actuated latch 28 at the checkout station which holds this bar and correctly positions the cart for the operations to be described hereinafter. This latch is disclosed and described in my aforesaid patent application, but essentially this latch automatically operates to latch the carriage in position. Also it automatically operates to push the cart slightly to the rear by means under control of the operator, to separate the cart from its discharging position which is shown in FIG. 1 herein.

The conveyor 14 which forms the bottom of the basket has a lower run which is exposed in a position to be engaged by a driving roll 30 moving in the direction of the arrow shown therein to cause the conveyor to operate to discharge the contents of the basket 20 onto the conveyor 12.

There is a front gate on the basket, this front gate being shown at 32 and means is provided for automatically raising the gate prior to operation of roll 30 to cause belt 14 to move and also to lower the gate once more after the operation is completed.

It has been found that where a conveyor 13 is moved by the shopper into a position against a fixed power operated roll, the shopper very often encounters difficulty in this respect and a firm engagement is not made, and the present invention provides means to obviate this difficulty so that there is no action needed on the part of the customer except merely to position the cart where the latch 28 can grasp the front cross strut 26.

The power operated roll 30 is movable between the dotted line position and the solid line position thereof, it being inoperative in the dotted line position and operative in the solid line position. It is mounted at one end of a lever 34 pivoted on a fixed axis at 36 and driven by a belt or a chain 38 in turn driven by a shaft on a fixed axis also at 36 which is driven by a belt or a chain 40 from a motor A. Therefore it will be seen that the roll 30 can be driven in its upright position without clutching when it is moved to the inoperative position.

The opposite end of the lever 34 is provided with a pivot 42 on which is mounted a rod 44, this rod being loosely mounted in an aperture in a plate 46. The rod 44 has two diameters, a larger diameter in a region thereof adjacent the pivot 42 and a smaller diameter which is indicated at 48 toward the free end thereof. The aperture in the plate 46 is of a size so that when plate 46 moves rectilinearly along the area 46, it has no effect on the rod 44 except to hold it from falling; but when plate 46 strikes the leading end of the enlarged portion of the rod 44, it moves it from a horizontal position wherein the roll 30 is in inoperative position, dotted lines, to the operative position thereof which is shown in solid lines. In other words, when the roll 30 is inoperative, the rod 44 is largely horizontal and extends to the right and at the same time the plate is at its right-hand limit of motion as will be explained.

The plate 46 is mounted on a piston rod 50 which has a piston working in a cylinder 52. This cylinder is provided with a motor B which has a pump 54 to operate the piston rod 50 in either direction at the will of the operator or cashier and this is done for the purpose above described, i.e., to raise roll 30 into its operative position. At the same time of course the motor A is energized for the purpose of driving belt 14. The downward motion of roll 30 on lever 34 can be initiated by the plate 46 striking a stop 56. Of course a spring could be used normally urging the lever 34 in a counterclockwise direction or even gravity could be relied on for this purpose.

The plate 46 is also connected to a rack 60 moving the same therewith, rack 60 being engaged with a fixed position, spur gear 62 driving a drum or pulley 64. This drum or pulley is provided with two cables 66 and 68, these being attached respectively to the top and the bottom of a gate lifting device 70. This gate lifter device is clearly shown and described in my copending application above identified, but in short when the cart is in the operative position of FIG. 1 the gate lifter 70 is in its lowermost position wherein it engages a notched projection on the gate. Hence when the rack moves to the left in FIG. 1, the gate is raised and when the rack moves to the right in FIG. 1, the gate is lowered, both actions being positive and not depending upon springs or on gravity.

Figure 2:
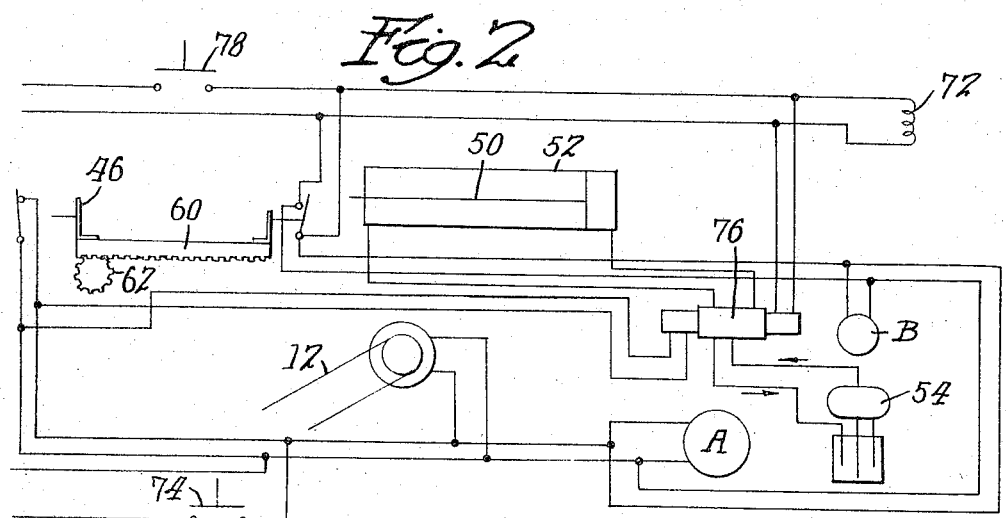
FIG. 2 is a diagrammatic representation of the power operated means therefor.

The coil indicated at 72 in FIG. 2 represents a solenoid for actuating the latch 28 to move it in a clockwise direction at the termination of the operation of discharging the merchandise from the shopping cart onto the conveyor 12, thus unlatching the cart and actually moving it to the rear slightly in order to dislodge it from its position of engagement with roll 30.

Where there is no cart in the position shown in FIG. 1, the roll 30 is in its dotted line position, i.e., down, the rack and piston 50 are withdrawn as far as possible to the right, and the gate lifter is in its lowermost position opposite the bottom of the gate. The customer in positioning the carriage in the correct location automatically has it latched by means of the latch 28. The cashier then steps on the foot switch 74 or the like actuator. This energizes motor A and motor B and the piston 50 and rack start moving to the left. This causes the gate 32 to rise but although the roll 30 is rotating, the plate 46 does not engage the thicker end of the rod 44 until such time as it is required to cause lever 34 to move in a clockwise direction to its extreme position as shown in solid lines in FIG. 1 to operatively engage the lower run of the conveyor 14. The gate 32 must be fully open before the merchandise starts to emerge from the front portion of the cart, and this is the reason for the lost motion connection comprising the thin part of rod 48 in its relationship with respect to the aperture in the plate 46.

The reference numeral 76 represents a valve which can be used to direct the fluid from the pump 54 to move the piston 50 in either direction as called upon and the piston and rack are held in their leftmost positions as long as desired. In order to return the parts to the original position, a switch at 78 is manipulated so as to return the valve 76 to its opposite position, thus bringing the gate down and lowering lever 34 and also energizing the coil 72 for the latch 28 as above described.

Limit and knock-off switches as may be required are utilized in order to provide for safe operation of the device.

Having thus described our invention and the advantages thereof, we do not wish to be limited to the details herein disclosed, otherwise than as set forth in the claims, but what we claim is:

1. The combination of an automatically discharging shopping cart and a checkout counter at which an operator is positioned to check the articles in the cart, wherein the cart includes a basket having an openable gate and a conveyor bottom in position to travel articles thereon to and through the gate, and the checkout counter includes a conveyor and means to drive the counter conveyor, said checkout counter also including power operated means to drive the basket bottom conveyor when the latter is in proper position relative to the checkout counter conveyor, said power operated means being movable generally vertically between an upper operative position in contact with the basket bottom conveyor and a lower inoperative position, power means to move said power operated means between the operative and inoperative positions thereof, and means on the checkout counter to control the position of the power operated means, said control means being under the control of the operator, and the power operated means being independent of the counter conveyor and the means to drive it.

2. The combination of claim 1 wherein the openable gate is located at the forward end of the basket, and the checkout counter includes means for opening said gate, power operated means for operating the gate opening means prior to operative positioning of the power operated means for driving the basket bottom conveyor in operative condition with respect to the counter conveyor.

3. The combination of claim 1 wherein said power operated means comprises a power driven roll and the means to move the same to and from operative condition comprises a lever, and a cam engaging the lever to bring the roll into engagement with said conveyor.

4. The combination of claim 1 wherein the power means to move the power operated means includes a fluid operated cylinder, a piston and a piston rod therefor, there being means connecting the piston rod to said power operated device for moving it between operative and inoperative positions.

5. The combination of claim 1 wherein the power means to move the power operated means includes a fluid operated cylinder, a piston and a piston rod therefor, there being means connecting the piston rod to said power operated device for moving it between operative and inoperative positions, and means actuated by said piston rod for moving the gate of the basket to open position.

6. The combination of claim 1 wherein the power means to move the power operated means includes a fluid operated cylinder, a piston and a piston rod therefor, there being means connecting the piston rod to said power operated means for moving it between operative and inoperative positions, and means actuated by said piston rod for moving the gate of the basket to open position prior to motion of said power operated means to operative position to actuate said basket bottom conveyor.

7. The combination of claim 1 wherein the power means to move the power operated means includes a fluid operated cylinder, a piston and a piston rod therefor, there being means connecting the piston rod to said power operated device for moving it between operative and inoperative positions, and means actuated by said piston rod for moving the gate of the basket to open position, said last-named means including a rack and pinion.

8. The combination of claim 1 including means to move said gate to open position, said gate moving means being actuated by the means which moves the power operated means between operative and inoperative positions.

9. The combination of claim 1 including means to move said gate to open position, said gate moving means being actuated by the means which moves the power operated means between operative and inoperative positions, and including a rotary member having a cable connected thereto, said cable being wound on said rotary member and connected to the gate moving means to move the same.

10. The combination of claim 1 including means to move said gate to open position, said gate moving means being actuated by the means which moves the power operated means between operative and inoperative positions, and including a rotary member having a cable connected thereto, said cable being wound on said rotary member and connected to the gate moving means to move the same, said means moving the power operated means to operative position being actuated in timed sequence to follow the action of the gate moving means, so that the gate is fully opened prior to actuation of the conveyor in the basket.

11. The combination of an automatically discharging shopping cart and a checkout counter wherein the cart includes a basket having an openable front gate and a conveyor bottom, and the checkout counter includes a power operated conveyor and a power operated roll and means to move the latter between an inoperative disengaged position and an operative position in firm contact with said basket conveyor to operate the same to discharge goods through the gate when the gate is open to the counter conveyor, means to open the gate, means under the control of the operator for actuating said roll moving means in a timed sequence to the gate opening means so that the gate opens prior to the actuation of the conveyor in the bottom of the basket to discharge goods therefrom, and means to operate the roll and separate means to operate the counter conveyor.

12. The combination of claim 11 including a latch for latching and holding the cart in operative position whereinsaid power operated roll is enabled to come into firm and snug contact with said conveyor in order to actuate the same.

References Cited by the Examiner
UNITED STATES PATENTS 2,569,711 10/1951 Fosten.
3,115,975 12/1963 Thompson _____ 214—44

EVON C. BLUNK, *Primary Examiner.*

H. C. HORNSBY, *Assistant Examiner.*